(12) United States Patent
Szor

(10) Patent No.: US 7,216,367 B2
(45) Date of Patent: May 8, 2007

(54) SAFE MEMORY SCANNING

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 880 days.

(21) Appl. No.: 10/371,945

(22) Filed: Feb. 21, 2003

(65) Prior Publication Data

US 2004/0168070 A1 Aug. 26, 2004

(51) Int. Cl.
*H04L 9/00* (2006.01)

(52) U.S. Cl. .............................. 726/25; 726/22; 726/23; 726/24; 713/165; 713/167; 713/188

(58) Field of Classification Search .................... None
See application file for complete search history.

(56) References Cited

U.S. PATENT DOCUMENTS

| | | | | |
|---|---|---|---|---|
| 5,274,819 A | * | 12/1993 | Blomfield-Brown | 718/100 |
| 5,361,359 A | * | 11/1994 | Tajalli et al. | 726/23 |
| 5,398,196 A | * | 3/1995 | Chambers | 714/28 |
| 5,822,517 A | | 10/1998 | Dotan | 395/186 |
| 7,028,305 B2 | * | 4/2006 | Schaefer | 719/310 |
| 7,085,928 B1 | * | 8/2006 | Schmid et al. | 713/164 |

OTHER PUBLICATIONS

Danseglio, D., 'Why rootkits mean you must nuke your machine', CNET Networks, 2005, entire document, http://www.zdnet.co.uk/misc/print/0,1000000169,39237277-39001093c,00.htm.*

Finnegan, J., 'Pop Open a Privileged Set of APIs with Windows NT Kernel Mode Drivers', Microsoft Corp., Microsoft Systems Journal, Mar. 1998, entire article, http://www.microsoft.com/MSJ/0398/driver.aspx.*

Szor, P., "*Attacks on WIN32*", Virus Bulletin Conference, Oct. 1998, Virus Bulletin Ltd., The Pentagon, Abingdon, Oxfordshire, England, pp. 57-84.

Szor, P., "*Memory Scanning Under Windows NT*", Virus Bulletin Conference, Sep. 1999, Virus Bulletin Ltd., The Pentagon, Abingdon, Oxfordshire, England, pp. 1-22.

Szor, P., "*Attacks on WIN32-Part II*", Virus Bulletin Conference, Sep. 2000, Virus Bulletin Ltd., The Pentagon, Abingdon, Oxfordshire, England, pp. 47-68.

(Continued)

*Primary Examiner*—Nasser Moazzami
*Assistant Examiner*—Ronald Baum
(74) *Attorney, Agent, or Firm*—Gunnison, McKay & Hodgson, L.L.P.; Lisa A. Norris

(57) ABSTRACT

A kernel mode memory scanning driver for use in safely scanning loaded drivers in the memory of computer systems utilizing Windows® NT based operating systems, such as Windows® 2000, Windows® XP, and other operating systems utilizing the Windows® NT kernel base, for viruses. Prior to scanning the loaded drivers for viruses, the kernel mode memory scanning driver hooks a driver unload function of the operating system, and stalls any calls to the driver unload function to prevent the loaded drivers from being unloaded during scanning. After scanning is complete, any stalled calls to the driver unload function are released. In one embodiment, the kernel mode memory scanning driver is implemented as a Windows® NT 4.0 kernel mode memory scanning driver, and thus can be used on computer systems utilizing Windows® 2000 or Windows® NT without platform specific code.

30 Claims, 6 Drawing Sheets

OTHER PUBLICATIONS

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.

Buysse, J., "*Virtual Memory: Window NT® Implementation*", pp. 1-15 [online]. Retrieved on Apr. 16, 2003. Retrieved from the Internet:<URL:http://people.msoe.edu/~barnicks/courses/cs384/papers19992000/buyssej-Term.pdf>.

Dabak, P., Borate, M. and Phadke, S., "*Hooking Windows NT System Services*", pp. 1-8 [online]. Retrieved on Apr. 16, 2003. Retrieved from the Internet:<URL:http://www.windowsitlibrary.com/Content/356/06/2.html>.

Fedotov, A., "*Paging Files Sample*", Alex Fedotov.com, pp. 1-2 [online]. Retrieved on Apr. 16, 2003. Retrieved from the Internet:<URL:http://www.alexfedotov.com/samples/pagefile.asp>.

"*How Entercept Protects: System Call Interception*"pp. 1-2 [online]. Retrieved on Apr. 16, 2003. Retrieved from the Internet:<URL:http://www.entercept.com/products/technology/kernelmode.asp>. No author provided.

"*How Entercept Protects: System Call Interception*", p. 1 [online]. Retrieved on Apr. 16, 2003. Retrieved from the Internet:<URL:http://www.entercept.com/products/technology/interception.asp>. No author provided.

Kath, R., "*The Virtual-Memory Manager in Windows NT*", pp. 1-11 [online]. Retrieved on Apr. 16, 2003. Retrieved from the Internet:<URL:http://msdn.microsoft.com/library/en-us/dngenlib/html/msdn__ntvmm.asp?frame=true>.

Szor, P. and Kaspersky, E., "*The Evolution of 32-Bit Windows Viruses*", Windows & .NET Magazine, pp. 1-4 [online]. Retrieved on Apr. 16, 2003. Retrieved from the Internet:<URL:http://www.winnetmag.com/Articles/Print.cfm?ArticleID=8773>.

\* cited by examiner

SAFE MEMORY SCANNING

BACKGROUND OF THE INVENTION

1. Field of the Invention

The present invention relates to the protection of computer systems. More particularly, the present invention relates to a method for scanning the memory of a computer system for viruses.

2. Description of the Related Art

Windows® NT and Windows® 2000 are 32-bit operating systems widely used on home and business computer systems. As such, virus writers are continually working to develop viruses that can attack and exploit these operating systems.

Windows® NT and Windows® 2000 provide page-based virtual memory management schemes that permit programs to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls that interface between the user mode and kernel mode functions.

In Windows® NT and Windows® 2000, memory is divided into equal portions termed pages. For example, on 32-bit Intel architectures, also known as IA32, pages are 4 KB in size, whereas Windows® 2000 on an Alpha CPU would use 8 KB pages. Use of memory pages, for example, read accesses, is controlled by control flags assigned to each page of memory. Pages that are read accessible by a program or driver, such as for scanning, are flagged valid and those that are not read accessible are flagged invalid, such as when a program does not have access rights or when a driver has been unloaded from memory.

In Windows® NT and Windows® 2000, a user mode program typically has read/write access to pages of memory accessed from the user address space. Whereas, kernel mode programs, such as kernel mode drivers, have read/write access to pages of memory accessed from the kernel address space and the user address space.

In the user address space, if a user mode application attempts a read access to an invalid page of memory, an exception, e.g., a page fault, is generated by the operating system. Typically, the exception is handled by an exception handler to prevent a crash of the operating system. However, in the kernel address space, exception handlers are not used to handle exceptions, such as page faults. Consequently, if a kernel mode application or driver attempts a read access to an invalid page of memory, an exception is generated by the operating system, and the operating system crashes on purpose.

Currently, the majority of Windows® viruses are loaded into user address space and implemented in the user mode. Anti-virus programs in the prior art typically ran in the user mode to detect computer viruses in the user address space. Recently, however, some newly emerged viruses are implemented as drivers in the kernel address space, e.g., a kernel mode driver virus. For example, WNT.Infis.4608 was implemented as a kernel mode driver virus under Windows® NT and a minor variant of this virus was developed for Windows® 2000. As the virus is run in the kernel mode, it is essentially undetectable in memory by anti-virus programs that implement memory scanning in the user mode.

SUMMARY OF THE INVENTION

In accordance with one embodiment of the invention, a method for safely scanning the memory of computer systems for viruses, such as kernel mode driver viruses, is described. In one embodiment, the method prevents drivers loaded in the memory of a computer system from being unloaded during scanning for the viruses, and then permits the unload of the drivers after scanning is complete.

In one embodiment, prior to scanning the loaded drivers for the viruses, a driver unload function of the operating system is hooked, and any calls to the driver unload function are stalled during scanning to prevent the loaded drivers from being unloaded during scanning. When scanning is complete, any stalled calls to the driver unload function are released.

In one embodiment, the method is implemented as a kernel mode memory scanning driver that runs on computer systems utilizing Windows® 2000 or Windows® NT operating systems, and is applicable to other operating systems having similar memory space functionalities, such as Windows® XP, Windows® XP 64-bit editions and other operating systems utilizing the Windows® NT kernel base.

In one embodiment, the kernel mode memory scanning driver is implemented as a Windows® NT 4.0 kernel mode memory scanning driver, and thus can be used on both Windows® 2000 and Windows® NT without platform specific code.

Embodiments in accordance with the invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Embodiments in accordance with the invention are described herein with reference to implementation on computer systems utilizing Windows® NT and Windows® 2000 operating systems. However, the invention is applicable to other operating systems having similar memory space functionalities, such as Windows® XP, Windows® XP 64-bit editions, and other operating systems utilizing the Windows® NT kernel base.

Figure 1:
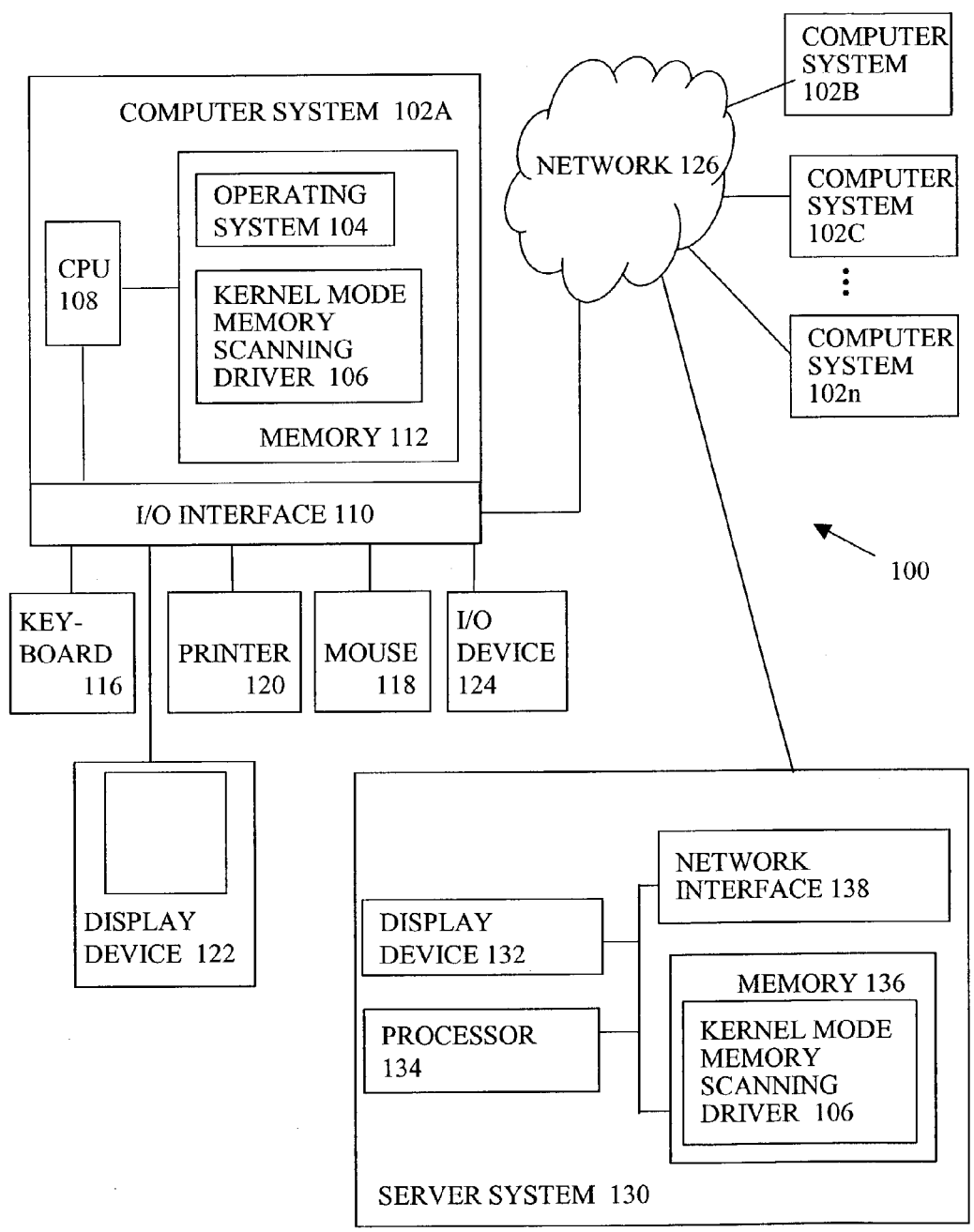
FIG. 1 is a diagram of a system that includes a kernel mode memory scanning driver executing on a computer system, according to one embodiment of the invention.

FIG. 1 is a diagram of a system that includes a kernel mode memory scanning driver 106 executing on a computer system 102A, according to one embodiment of the invention. Computer system 102A can be a stand-alone system, such as a personal computer or workstation, as illustrated schematically in FIG. 1 by computer system 102A. Computer system 102A can also be part of a client-server configuration 100 that is also illustrated in FIG. 1 in which computer system 102A interacts with a server system 130 via a network 126, such as the Internet.

Kernel mode memory scanning driver 106 is described herein as executed on computer system 102A, e.g., a first computer system. However, in light of this disclosure, those of skill in the art can understand that the description is applicable to client-server system 100 and computer systems 102B, 102C, through 102n, interacting simultaneously or serially with server system 130, e.g., a second computer system.

Referring to FIG. 1, in one embodiment, an operating system 104 of computer system 102A implements a virtual memory address management scheme that utilizes a virtual memory address space having a kernel address space and a user address space. Kernel mode memory scanning driver 106 is loaded as a kernel mode driver into the kernel address space implemented by operating system 104 and physically stored in a memory 112 of computer system 102A. In the present embodiment, kernel mode memory scanning driver 106 is implemented as a kernel mode driver and enables detection of kernel mode driver viruses.

Computer system 102A, sometimes called a host, user, or client device, typically includes a central processing unit (CPU) 108, hereinafter processor 108, an input/output (I/O) interface 110, and a memory 112. Computer system 102A may further include: standard input devices, such as a keyboard 116, and a mouse 118; standard output devices, such as a printer 120, and a display device 122; as well as, one or more standard input/output (I/O) devices 124, such as a compact disk (CD) or DVD drive, floppy disk drive, or other digital or waveform port for inputting data to and outputting data from computer system 102A. In one embodiment, memory 112 includes a main memory, as well as any supplemental memories, and includes executable areas, data storage areas, and any memory areas needed by computer system 102A (including operating system 104).

In one embodiment, kernel mode memory scanning driver 106 is loaded into computer system 102A via I/O device 124, such as from a CD or floppy disk containing memory scanning driver 106. In other embodiments, such as client-server embodiments, kernel mode memory scanning driver 106 can be downloaded into computer system 102A from server system 130 via network 126. Server system 130 can further include: a network interface 138 for communicating with network 126; a memory 136 for storing kernel mode memory scanning driver 106; a processor 134; and, a display device 132.

Operating system 104 utilizes virtual memory management to map virtual addresses located in the virtual memory address space to code and/or data located in memory 112. In one embodiment, operating system 104 is a 32-bit operating system that utilizes a virtual memory management scheme, such as Windows® NT and Windows® 2000. Windows® NT and Windows® 2000 operating systems are well known to those of skill in the art and widely documented, such as in Windows® NT and Windows® 2000 System Development Kits (SDKs)(available from Microsoft, Inc., Redmond, Wash.), and, thus, are not further described herein.

In the present embodiment, kernel mode memory scanning driver 106 is loaded as a kernel mode driver into the kernel address space of the virtual memory address space implemented by operating system 104, for example, as a memscan.sys driver, and executed by processor 108 of computer system 102A as further described herein with reference to FIGS. 2, 3, 4, 5, and 6.

Figure 2:
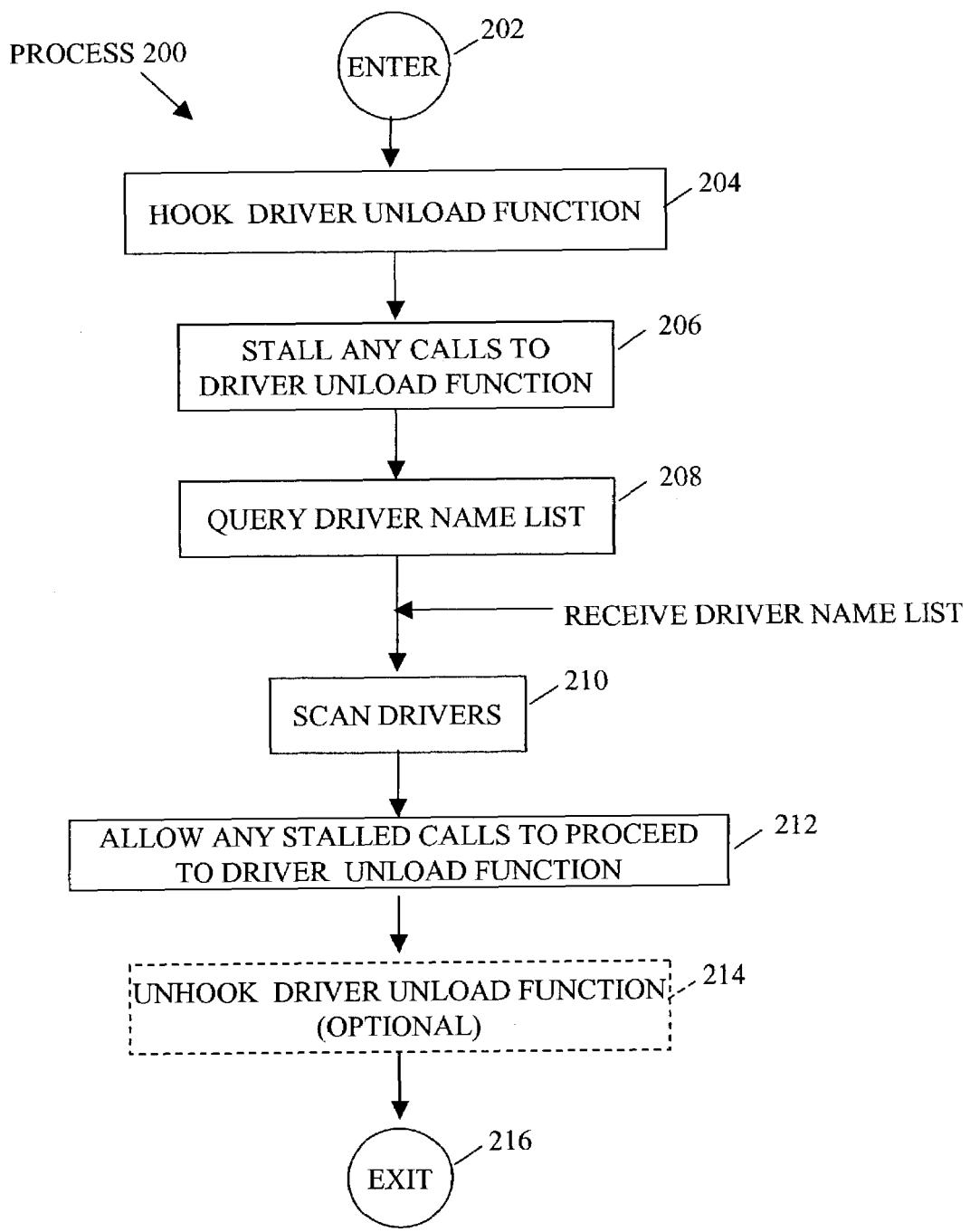
FIG. 2 is a flow diagram of a process implemented by the kernel mode memory scanning driver of FIG. 1 in accordance with one embodiment of the invention.

FIG. 2 is a flow diagram of a process 200 implemented by kernel mode memory scanning driver 106 in accordance with one embodiment of the invention. As earlier described, anti-virus programs in the prior art typically ran in the user mode and essentially could not detect kernel mode driver viruses.

In one embodiment, process 200 scans in the kernel mode, any drivers loaded in the memory of a computer system for viruses. Scanning the loaded drivers in the kernel mode permits detection of kernel mode driver viruses that were essentially undetectable in memory by prior art anti-virus programs run in the user mode. In one embodiment, prior to scanning the loaded drivers for viruses, process 200 hooks a driver unload function of operating system 104 (FIG. 1) and stalls any calls to the driver unload function during scanning to prevent any loaded drivers from being unloaded during scanning. When scanning is complete, any stalled calls to the driver unload function are released.

Referring now to FIGS. 1 and 2 together, in one embodiment, execution of kernel mode memory scanning driver 106 by processor 108 results in the implementation of process 200 as described herein. Kernel mode memory scanning driver 106 is called by processor 108 from the kernel address space of the virtual memory address space implemented by operating system 104. For example, if kernel mode memory scanning driver 106 is loaded as memscan.sys, processor 108 calls memscan.sys.

From an ENTER operation 202, flow moves to a HOOK DRIVER UNLOAD FUNCTION operation 204. In HOOK DRIVER UNLOAD FUNCTION operation 204, kernel mode memory scanning driver 106 hooks a driver unload function of operating system 104 that is responsible for unloading a driver from computer system 102A. Hooking a function allows a process to intercept the particular function on a program wide or operating system wide basis prior to execution.

Figure 3:
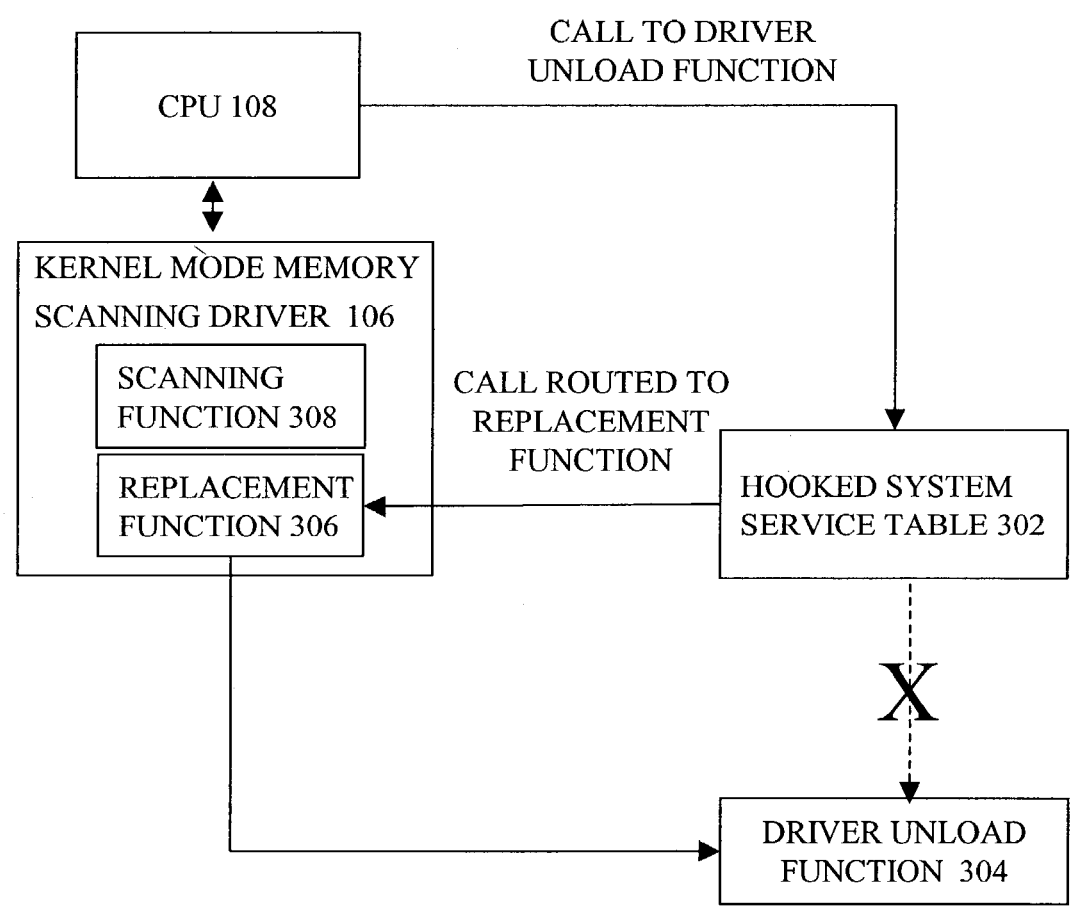
FIG. 3 is a functional diagram illustrating hooking of a driver unload function according to one embodiment of the invention.

FIG. 3 is a functional diagram illustrating hooking of a driver unload function according to one embodiment of the invention. Referring to FIGS. 1, 2 and 3, together, a call to a driver unload function 304 from processor 108 is routed to a hooked system service table 302. As is well known to those of skill in the art, a system service table, sometimes called a service address dispatch table, a dispatch table, or a system call table, relates system calls to specific addresses within the operating system.

In accordance with one embodiment of the invention, hooked system service table 302, redirects the call to driver unload function 304 to a replacement function 306 and from the specific address of driver unload function 304 to which the call would otherwise be directed (indicated by dashed line). In one embodiment, kernel mode memory scanning driver 106 hooks the call to driver unload function 304 by replacing the original pointer to driver unload function 304 with a replacement pointer to replacement function 306.

In one embodiment, in which operating system 104 is a Windows® NT operating system, kernel mode memory scanning driver 106 hooks a ZwUnloadDriver( ) function, e.g., driver unload function 304. In one embodiment, kernel mode memory scanning driver 106 hooks the ZwUnload-Driver( ) function specified as:

NTSYSAPI
NTSTATUS
NTAPI
ZwUnloadDriver(IN PUNICODE_STRING DriverServiceName);

In hooking the ZwUnloadDriver( ) function, kernel mode memory scanning driver 106 locates the address of the ZwUnloadDriver( ) function.

Kernel mode memory scanning driver 106 modifies the address of the ZwUnloadDriver( ) function, for example, by using a KeServiceDescriptorTable pointer. In one embodiment, the new modified function pointer redirects calls made to the ZwUnloadDriver( ) function, e.g., driver unload function 304, to a HookzwUnloadDriver( ) function, e.g., replacement function 306 of kernel mode memory scanning driver 106, specified as:

NTSYSAPI
NTSTATUS
NTAPI
HookZwUnloadDriver(IN PUNICODE_STRING pDriverServiceName).

From HOOK DRIVER UNLOAD FUNCTION operation 204, flow moves to a STALL ANY CALLS TO DRIVER UNLOAD FUNCTION operation 206.

In STALL ANY CALLS TO DRIVER UNLOAD FUNCTION operation 206, in one embodiment, kernel mode memory scanning driver 106 stalls any calls to driver unload function 304. In,one embodiment, replacement function 306 of kernel mode memory scanning driver 166 stalls any calls to driver unload function 304 until scanning of the loaded drivers is complete. By stalling any calls to driver unload function 304, memory pages related to a loaded driver are prevented from being marked invalid for access and scanning purposes due to a driver being unloaded. From STALL ANY CALLS TO DRIVER UNLOAD FUNCTION operation 206, flow moves to a QUERY DRIVER NAME LIST operation 208.

In QUERY DRIVER NAME LIST operation 208, kernel mode memory scanning driver 106 determines the names and load addresses of loaded drivers on computer system 102A. In one embodiment, kernel mode memory scanning driver 106 utilizes the ZwQuerySystemInformation( ) function to get the list of loaded drivers and their addresses. This query provides a complete list of the loaded drivers even those that are not available via an Object Manager's query functions, e.g., even those drivers not having a driver object in the Object Manager.

In another embodiment, kernel mode memory scanning driver 106 utilizes the ZwQueryDirectoryobject( ) function to check \Driver and \File System directories of an Object Manager database utilized by operating system 104 to search for and locate the load addresses of all drivers that are known by the Object Manager database. (Some of the system drivers are not known by the Object Manager, but some known driver viruses, such as for example, WNT.Infis or W2K.Infis, will be represented there with their own Driver Object). The load address of each driver is available in its Driver Object. When kernel mode memory scanning driver 106 receives the driver name list and load addresses for the loaded drivers, from QUERY DRIVER NAME LIST operation 208, flow moves to a SCAN DRIVERS operation 210.

In SCAN DRIVERS operation 210, a scanning function 308 is called to scan each of the loaded drivers on the driver name list for viruses. SCAN DRIVERS operation 210 is further described herein with reference to FIG. 4 and process 400. From SCAN DRIVERS operation 210, flow moves to an ALLOW ANY STALLED CALLS TO PROCEED TO DRIVER UNLOAD FUNCTION operation 212.

In ALLOW ANY STALLED CALLS TO PROCEED TO DRIVER UNLOAD FUNCTION operation 212, any calls redirected to replacement function 306, are allowed to proceed to driver unload function 304. In one embodiment, replacement function 306 directly makes the call to driver unload function 304. From ALLOW ANY STALLED CALLS TO PROCEED TO DRIVER UNLOAD FUNCTION operation 212, flow, optionally, moves to an UNHOOK DRIVER UNLOAD FUNCTION operation 214, or returns to STALL ANY CALLS TO DRIVER UNLOAD FUNCTION operation 206.

In optional UNHOOK DRIVER UNLOAD FUNCTION operation 214, kernel mode memory scanning driver 106 unhooks driver unload function 304. Continuing with the Windows® NT example, in one embodiment, kernel mode memory scanning driver 106 unhooks the ZwUnloadDriver( ) function, e.g., driver unload function 304, by modifying the hooked system service table 302 to the original entry point to driver unload function 304. From, optional UNHOOK DRIVER UNLOAD FUNCTION operation 214, flow exits process 200 at EXIT operation 216.

Figure 4:
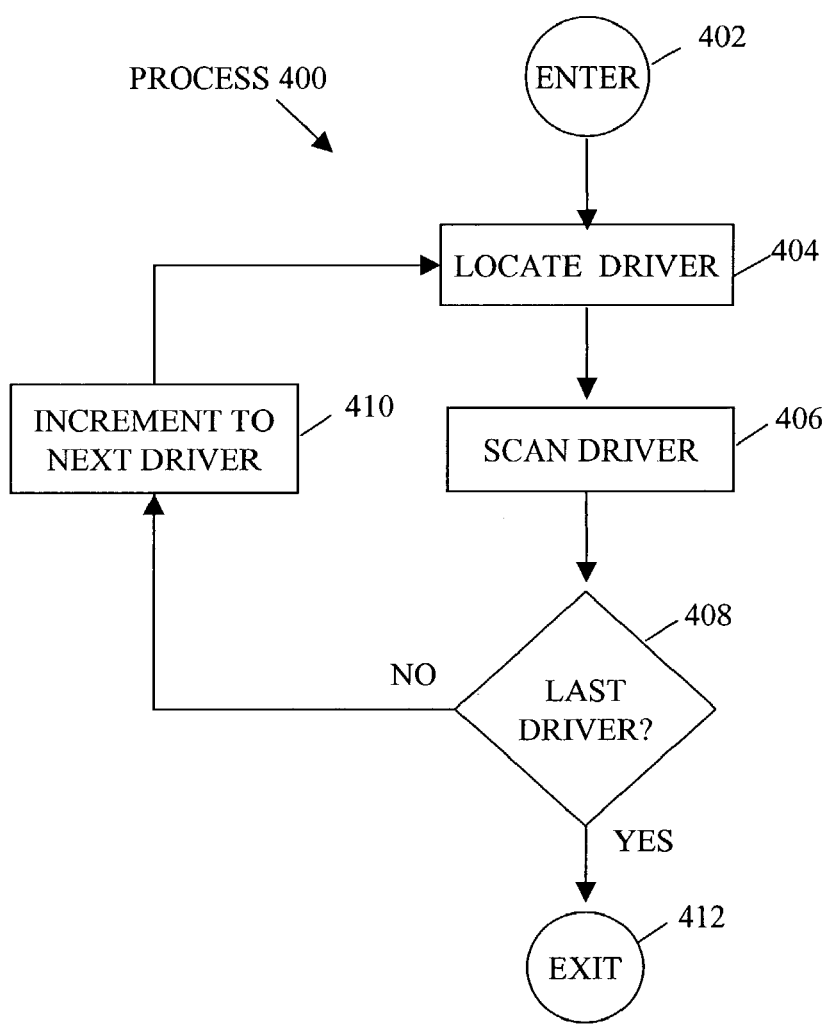
FIG. 4 is a flow diagram of a process for scanning drivers in the SCAN DRIVERS operation of FIG. 2 in accordance with one embodiment of the invention.

FIG. 4 is a flow diagram of a process 400 for scanning drivers in SCAN DRIVERS operation 210 of FIG. 2 in accordance with one embodiment of the invention. Conventionally, a 32-bit virtual address is translated into a specific memory location in memory 112 by a mapper of operating system 104. For example, typically the first 10 bits of the virtual address serve as a first offset that is used to index a 32-bit page directory entry (PDE) located in a page of memory called the page directory. The next 10 bits serve as a second offset that is used to index a 4-byte page table entry (PTE) in a page of memory called the page table. A PTE identifies a page of memory called a page frame. The remaining 12-bits serve as a third offset which is used to address a specific byte of memory in the page frame identified by the PTE.

In Windows® NT and Windows® 2000, PTEs are used to provide access to the physical pages of memory. The operating systems control the use of memory pages by using control flags assigned to each memory page. Typically, a control flag is the final three bits of the PTE and, for purposes of the present description, indicate if a page is valid or invalid for read access. As earlier described, in the kernel mode, page faults that arise due to attempts to read access an invalid page are not handled by exception handlers. Consequently, in the kernel mode, page faults that are generated by attempts to scan an invalid page of memory for viruses results in the operating system crashing.

Referring now to FIGS. 1, 2, 3 and 4 together, according to process 400, in one embodiment, a first driver loaded in computer system 102A, is located and scanned for viruses with validity queries at each page of memory. Even though driver unload function 304 was hooked by kernel mode memory scanning driver 106 in HOOK DRIVER UNLOAD FUNCTION operation 204, it is important to ensure that any calls to driver unload function 304 were stalled by replacement function 306 so that operating system 104 is not crashed due to an attempt to access an invalid page of memory by scanning function 308.

In the present embodiment, the loaded drivers to be scanned are kernel mode drivers formatted as a Portable Executable (PE) files. A PE file is an executable file format commonly used in Windows® systems.

Generally, a PE file format includes a DOS MX header, a DOS stub, a PE header, a section table, and a plurality of sections. The section table is an array of structures that contains the information about each section in the PE file such as its attribute, the file offset, and virtual offset. Each section is simply a block of code and/or data with common attributes. Once mapped into memory, sections start on at least a page boundary, e.g., the first byte of each section corresponds to a memory page. The PE format is documented in Windows® NT and Windows® 2000 software developer's kits (SDKs) (available from Microsoft, Inc. of Redmond, Wash.) and is well-known to those of skill in the art and not further described herein.

From an ENTER operation 402, flow moves to a LOCATE DRIVER operation 404. In LOCATE DRIVER operation 404, kernel mode memory scanning driver 106 locates, initially, a first driver to be scanned at the corresponding load address provided in the driver name list. From LOCATE DRIVER operation 404, flow moves to a SCAN DRIVER operation 406.

In SCAN DRIVER operation 406, a scan driver function is called to scan, initially, the first driver for viruses. The scan driver function can utilize a wide variety of scanning techniques. In one embodiment, the scanning is implemented using p-code language based detection techniques. One of skill in the art can recognize, however, that other scanning techniques can also be used. SCAN DRIVER operation 406 is further described herein with reference to FIGS. 5 and 6. From SCAN DRIVER operation 406, flow moves to a LAST DRIVER check operation 408.

In LAST DRIVER check operation 408, kernel mode memory scanning driver 106 determines if the driver scanned in SCAN DRIVER operation 406 is the last driver to scan in the driver name list. For example, the determination can be made by initially identifying each driver on the driver name list as driver 1 through driver n, and determining if a counter value x=n for the driver scanned in SCAN DRIVER operation 406. If the driver scanned in SCAN DRIVER operation 406 is not the last driver, e.g., x does not equal n, from LAST DRIVER check operation 408, flow moves to an INCREMENT TO NEXT DRIVER operation 410.

In INCREMENT TO NEXT DRIVER operation 410, the next driver on the driver name list is selected for scanning. For example, by incrementing from the current identifier of a driver on the driver name list, e.g., driver 1, to a next identifier corresponding to a next driver on the driver name list, e.g., a driver 2. From INCREMENT TO NEXT DRIVER operation 410, flow moves to LOCATE DRIVER operation 404 for the next driver.

Referring again to LAST DRIVER check operation 408, if a determination is made in LAST DRIVER check operation 408 that the driver scanned in SCAN DRIVER operation 406 is the last driver to be scanned, e.g., x equals n, from LAST DRIVER check operation 408, flow exits process 400 at EXIT operation 412 and reenters process 200 at ALLOW ANY STALLED CALLS TO PROCEED TO DRIVER UNLOAD FUNCTION operation 212.

Figure 5:
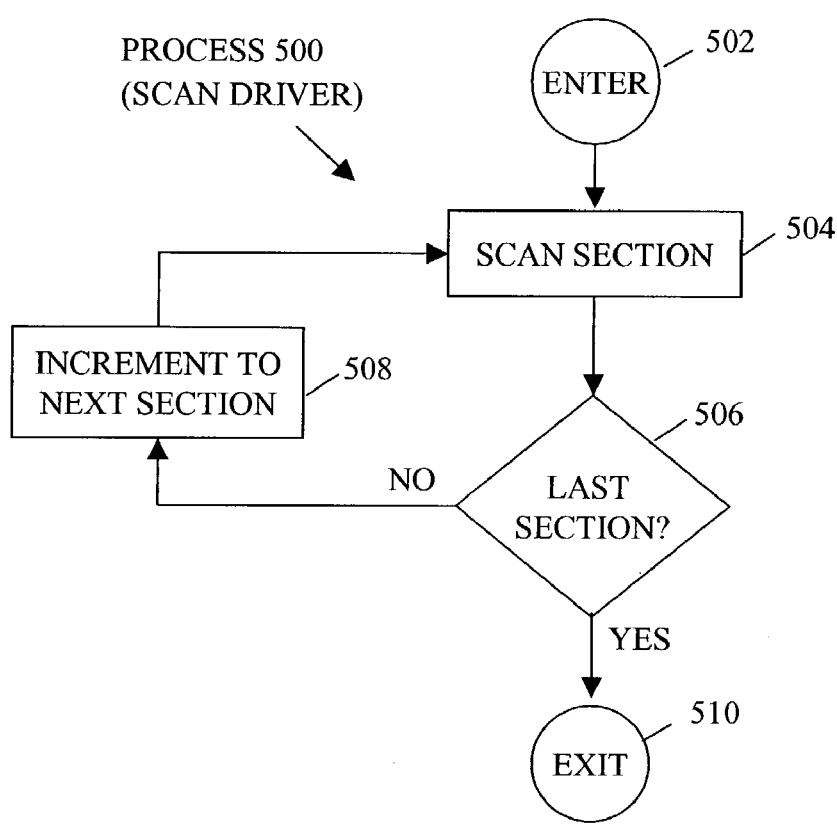
FIG. 5 is a flow diagram of a process for scanning a section in the SCAN DRIVER operation of FIG. 4 in accordance with one embodiment of the present invention.

FIG. 5 is a flow diagram of a process 500 for scanning a driver in SCAN DRIVER operation 406 of FIG. 4 in accordance with one embodiment of the invention. Referring now to FIGS. 4 and 5 together, according to process 500, in one embodiment, initially, the first driver is scanned for viruses. From an ENTER operation 502, flow moves to a SCAN SECTION operation 504.

In SCAN SECTION operation 504, kernel mode memory scanning driver scans the section for viruses. SCAN SECTION operation 504 is further described herein with reference to FIG. 6 and process 600. From SCAN SECTION operation 504, flow moves to a LAST SECTION check operation 506.

In LAST SECTION check operation 506, kernel mode memory scanning driver 106 determines if the section scanned in SCAN SECTION operation 504 is the last section to scan in the driver. For example, the determination can be made by initially identifying each section in the section table as section 1 through section n, and determining if a counter value x=n for the section scanned in SCAN SECTION operation 504. If the section scanned in SCAN SECTION operation 504 is not the last section in the driver to be scanned, e.g., x does not equal n, from LAST SECTION check operation 506, flow moves to INCREMENT TO NEXT SECTION operation 508.

In INCREMENT TO NEXT SECTION operation 508, the next section is selected for scanning. For example, by incrementing from the current identifier of a section in the section table, e.g., section 1, to a next identifier corresponding to a next section in the section table, e.g., a section 2. From INCREMENT TO NEXT SECTION operation 508, flow moves to SCAN SECTION operation 504.

Referring again to LAST SECTION check operation 506, if it is determined in LAST SECTION check operation 506 that the section scanned in SCAN SECTION operation 504 is the last section in the driver to be scanned, from LAST SECTION check operation 506, flow exits process 500 at EXIT operation 510 and reenters process 400 at LAST DRIVER check operation 408.

Figure 6:
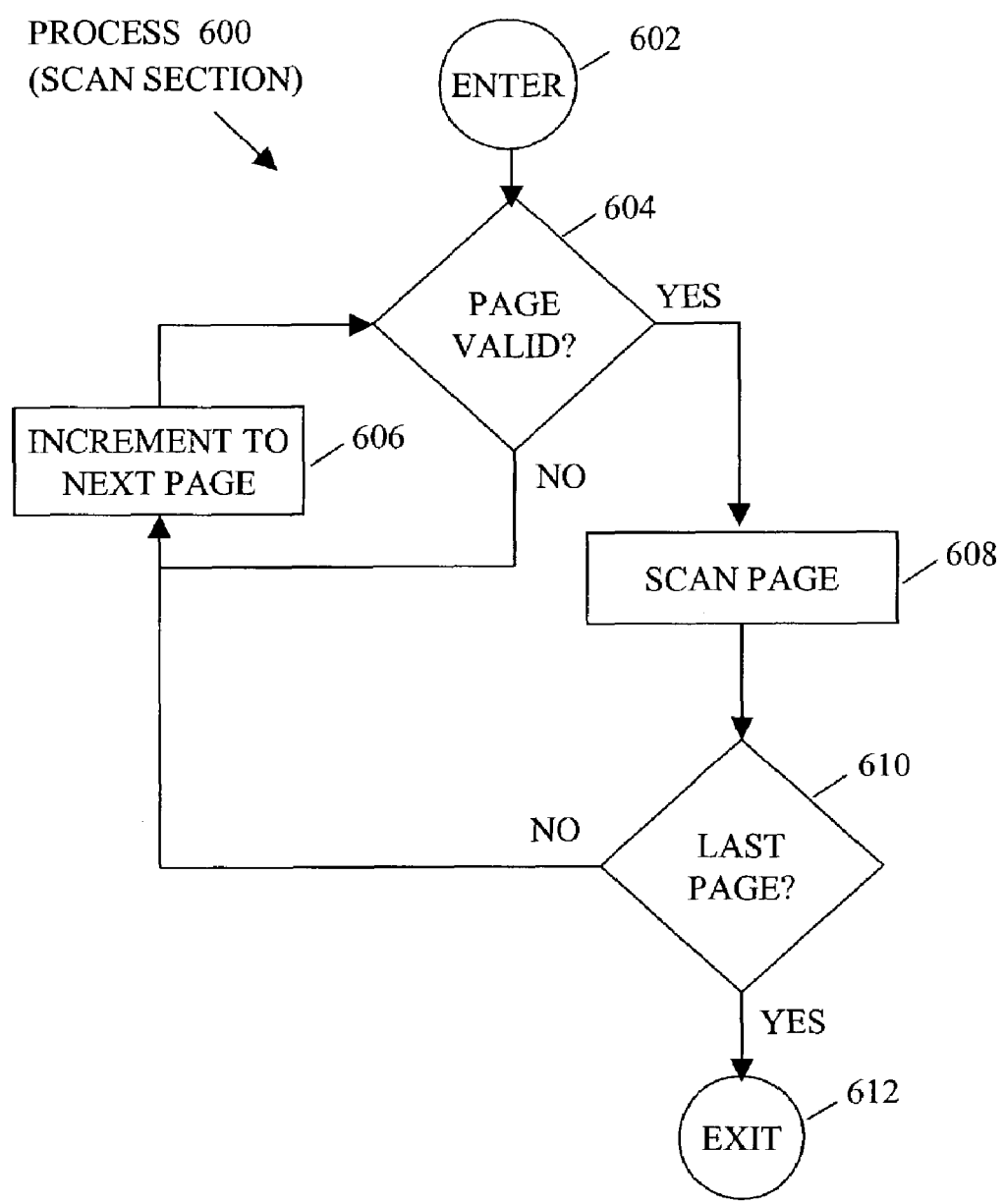
FIG. 6 is a flow diagram of a process for scanning a section in the SCAN SECTION operation of FIG. 5 in accordance with one embodiment of the present invention.

FIG. 6 is a flow diagram of a process 600 for scanning a section in SCAN SECTION operation 504 of FIG. 5 in accordance with one embodiment of the invention. Referring to FIGS. 5 and 6 together, in one embodiment, from an ENTER operation 602, flow moves to a PAGE VALID check operation 604.

In PAGE VALID check operation 604, kernel mode memory scanning driver 106 determines if a page of memory to be scanned is valid. In one embodiment, kernel mode memory scanning driver 106 calls a page valid query function to determine if the page, such as a first page, in the current section of the driver being scanned is valid.

In one embodiment, in which operating system 104 is a Windows® NT operating system, kernel mode memory scanning driver 106 utilizes a MmIsAddressValid( ) function to check whether a given page in memory is valid. The MmIsAddressValid( ) function returns a response indicating whether the page is valid or not. If the page is not valid, from PAGE VALID check operation 604, flow moves to an INCREMENT TO NEXT PAGE operation 606.

In INCREMENT TO NEXT PAGE operation 606, the next page is selected for scanning. For example, by incrementing from the current identifier of a page, e.g., page 1, to a next identifier corresponding to a next page, e.g., a page 2. From INCREMENT TO NEXT PAGE operation 606, flow moves to PAGE VALID check operation 604.

Referring again to PAGE VALID check operation 604, if it is determined in PAGE VALID check operation 604 that the page is valid, from PAGE VALID check operation 604, flow moves to a SCAN PAGE operation 608.

In SCAN PAGE operation 608, kernel mode memory scanning driver 106 scans the page for viruses. In one embodiment, kernel mode memory scanning driver 106 calls a scan page function to scan the page, such as the first page, for viruses. From SCAN PAGE operation 608, flow moves to a LAST PAGE check operation 610.

In LAST PAGE check operation 610, kernel mode memory scanning driver 106 determines if the page scanned in SCAN PAGE operation 608 is the last page to scan in the section. For example, the determination can be made by initially identifying each page as page 1 through page n, and determining if a counter value x=n for the page scanned in SCAN PAGE operation 608. If the page scanned in SCAN PAGE operation 608 is not the last page in the section to be scanned, e.g., x does not equal n, from LAST PAGE check operation 610, flow moves to INCREMENT TO NEXT PAGE operation 606 earlier described.

Referring again to LAST PAGE check operation 610, if it is determined in LAST PAGE check operation 610 that the page scanned in SCAN PAGE operation 608 is the last page in the section, from LAST PAGE check operation 610, flow exits process 600 at EXIT operation 612 and renters process 500 at LAST SECTION check operation 506.

By hooking the driver unload function and preventing drivers from being unloaded during scanning, embodiments in accordance with the present invention can safely detect kernel mode driver viruses by preventing operating system crashes due to attempts to scan, e.g., read, pages of memory that would have become invalid if a driver was unloaded during scanning.

In view of this disclosure, the methods and kernel mode memory scanning driver functionalities described in accordance with any, all or a portion of the embodiments of the invention can be implemented in a wide variety of computer system configurations. While embodiments in accordance with the invention have been described primarily with reference to kernel mode memory scanning driver 106 (including any, all or a portion of processes 200, 300, 400, 500, and 600) implemented on a stand alone configuration such as computer system 102A, other embodiments in accordance with the invention can be implemented using a client-server system, such as client-server system 100, and can be implemented using any suitable hardware configuration involving a computer device.

Embodiments of the present invention, including any, all or a portion of processes 200, 300, 400, 500, and 600, can be embodied as a computer program product. Herein, a computer program product comprises a computer-readable medium configured to store or transport computer program code. Some examples of computer program products are CDs, ROM cards, DVDs, floppy discs, magnetic tapes, computer hard drives, servers on a network and signals transmitted over a network representing computer readable code.

As illustrated in FIG. 1, this storage medium may belong to the computer system itself. However, the storage medium also may be removed from the computer system. For example, kernel mode memory scanning driver 106 (including any, all or a portion of processes 200, 300, 400, 500, and 600) can be stored in memory 112 that is physically located in a location different from processor 108. Processor 108 should be coupled to the memory 112. This could be accomplished in a client-server system, such as client-server system 100 and memory 136, or alternatively via a connection to another computer via modems and analog lines, or digital interfaces and a digital carrier line.

More specifically, in one embodiment, computer system 102A and/or server system 130 is a portable computer, a workstation, a two-way pager, a cellular telephone, a digital wireless telephone, a personal digital assistant, a server computer, an Internet appliance, or any other device that includes the components shown and that can execute kernel mode memory scanning functionalities in accordance with at least one of the embodiments as described herein.

Similarly, in another embodiment, computer system 102A and/or server system 130 is comprised of multiple different computers, wireless devices, cellular telephones, digital telephones, two-way pagers, or personal digital assistants, server computers, or any desired combination of these devices that are interconnected to perform, the methods as described herein.

This disclosure provides exemplary embodiments of the present invention. The scope of the invention is not limited by these exemplary embodiments. Numerous variations, whether explicitly provided for by the specification or implied by the specification or not, may be implemented by one of skill in the art in view of this disclosure.

What is claimed is:

1. A method comprising:
preventing an unload of at least one loaded driver from a memory of a computer system;
scanning in kernel mode the at least one loaded driver for viruses; and
permitting the unload of the at least one loaded driver from the memory of the computer system after the scanning is complete.

2. The method of claim 1, wherein the preventing an unload of at least one loaded driver further comprises:
hooking a driver unload function of an operating system of the computer system; and
stalling any calls to the driver unload function.

3. The method of claim 2, further comprising:
unhooking the driver unload function of the operating system after the scanning is complete.

4. The method of claim 2, wherein the operating system utilizes virtual memory management.

5. The method of claim 2, wherein the operating system is a Windows®NT-based operating system.

6. The method of claim 2, wherein the operating system is a Windows® NT kernel-based operating system.

7. The method of claim 2, wherein the operating system is Windows® NT.

8. The method of claim 2, wherein the operating system is Windows® 2000.

9. The method of claim 2, wherein the operating system is Windows® XP.

10. A method comprising:
hooking a driver unload function of an operating system;
stalling any calls to the driver unload function;
querying a driver name list from the operating system;
receiving the driver name list, the driver name list identifying one or more loaded drivers and corresponding load addresses;
scanning the one or more loaded drivers for viruses; and
allowing the any calls to proceed to the driver unload function after the scanning is complete.

11. The method of claim 10, wherein the hooking a driver unload function further comprises:
redirecting a call to the driver unload function in a hooked system service table utilized by the operating system with a pointer to a replacement function.

12. The method of claim 10, wherein the hooking a driver unload function further comprises:
hooking a ZwUnloadDriver() function.

13. The method of claim 10, further comprising:
unhooking the driver unload function of the operating system after the scanning is complete.

14. The method of claim 10, wherein the querying a driver name list from the operating system is implemented utilizing a ZwQuerySystemlnformation() function.

15. The method of claim 10, wherein the querying a driver name list from the operating system is implemented utilizing a ZwQueryDirectoryObject() function.

16. The method of claim 10, wherein the scanning the one or more loaded drivers for viruses further comprises:
locating a first loaded driver;
scanning the first loaded driver for the viruses;
determining if the first loaded driver is a last loaded driver to be scanned;
if the first loaded driver is not the last loaded driver to be scanned, incrementing to a next loaded driver; and
if the first loaded driver is the last loaded driver to be scanned, returning to the allowing the any calls to proceed to the driver unload function.

17. The method of claim 16, wherein the scanning the first loaded driver for the viruses further comprises:
scanning a first section of the first loaded driver for the viruses;
determining if the first section is a last section to be scanned;
if the first section is not the last section to be scanned, incrementing to a next section; and
if the first section is the last section to be scanned, returning to the determining if the first loaded driver is a last loaded driver to be scanned.

18. The method of claim 17, wherein the scanning a first section of the first loaded driver for the viruses further comprises:
determining if a first page of the first section is valid;
if the first page is not valid, incrementing to a next page;
if the first page is valid, scanning the first page for the viruses;
determining if the first page is a lastpage to be scanned;
if the first page is not the last page to be scanned, incrementing to the next page; and
if the first page is the last page to be scanned, returning to the determining if the first section is a last section to be scanned.

19. A method comprising:
hooking a driver unload function of an operating system, wherein the hooking a driver unload function further comprises:
redirecting a call to the driver unload function in a hooked system service table utilized by the operating system with a pointer to a replacement function, wherein the redirecting a call to the driver unload function in a hooked system service table is implemented by modifying an address of a ZwUnloadDriver() function using a KeServiceDescriptorTable pointer;
stalling any calls to the driver unload function;
querying a driver name list from the operating system;
receiving the driver name list, the driver name list identifying one or more loaded drivers and corresponding load addresses;
scanning the one or more loaded drivers for viruses; and
allowing the any calls to proceed to the driver unload function after the scanning is complete.

20. The method of claim 19, wherein the call to the driver unload function is a call to the ZwUnloadDriver() function, and
further wherein the KeServiceDescriptorTable pointer redirects the call to the ZwUnloadDriver() function to a HookZwUnloadDriver() function.

21. A computer program product comprising a computerreadable medium containing a kernel mode memory scanning driver for scanning a memory of a computer system for viruses, utilizing an operating system implementing a virtual memory, the kernel mode memory scanning driver comprising:
a scanning function; and
a replacement function.

22. The computer program product of claim 21, wherein the kernel mode memory scanning driver is loaded into a kernel address space of the virtual memory.

23. The computer program product of claim 21, wherein the scanning function scans drivers loaded in the memory of the computer system for the viruses.

24. The computer program product of claim 23, wherein prior to scanning the drivers loaded in the memory for the viruses, a driver unload function of the operating system is hooked so that calls made to the driver unload function are routed to the replacement function and stalled until the scanning is complete.

25. The computer program product of claim 23, wherein the kernel mode memory scanning driver implements a method comprising:
preventing an unload of at least one of the drivers loaded in the memory;
scanning in a kernel mode the at least one of the drivers loaded in the memory for the viruses; and
permitting the unload of the at least one of the drivers loaded in the memory after the scanning is complete.

26. A computer system comprising:
a means for hooking a driver unload function of an operating system;
a means for stalling any calls to the driver unload function;
a means for querying a driver name list from the operating system;
a means for receiving the driver name list, the driver name list identifying one or more loaded drivers and corresponding load addresses;
a means for scanning the one or more loaded drivers for viruses; and
a means for allowing the any calls to proceed to the driver unload function.

27. The computer system of claim 26, further comprising:
a means for unhooking the driver unload function of the operating system.

28. A computer program product comprising a computer-readable medium containing computer program code for a method comprising:
preventing an unload of at least one loaded driver from a memory of a computer system;

scanning in a kernel mode the at least one loaded driver for viruses; and permitting the unload of the at least one loaded driver from the memory of the computer system after the scanning is complete.

29. A computer program product comprising a computer-readable medium containing computer program code for a method comprising:

hooking a driver unload function of an operating system;

stalling any calls to the driver unload function;

querying a driver name list from the operating system;

receiving the driver name list, the driver name list identifying one or more loaded drivers and corresponding load addresses;

scanning the one or more loaded drivers for viruses; and allowing the any calls to proceed to the driver unload function after the scanning is complete.

30. The computer program product of claim 29, the method further comprising:

unhooking the driver unload function of the operating system after the scanning is complete.

* * * * *

UNITED STATES PATENT AND TRADEMARK OFFICE
CERTIFICATE OF CORRECTION

PATENT NO. : 7,216,367 B2 Page 1 of 1
APPLICATION NO. : 10/371945
DATED : May 8, 2007
INVENTOR(S) : Peter Szor It is certified that error appears in the above-identified patent and that said Letters Patent is hereby corrected as shown below:

Column 11
At line 47, after "is a", change "lastpage" to read -- last page --.

Column 12
At line 15, after "comprising a", change "comput-erreadable" to read
-- computer-readable --.

Signed and Sealed this

Twenty-fourth Day of July, 2007

JON W. DUDAS
*Director of the United States Patent and Trademark Office*